United States Patent
Ludwig et al.

(10) Patent No.: US 9,226,101 B1
(45) Date of Patent: Dec. 29, 2015

(54) FEDERATED BLUETOOTH DEVICE NETWORK WITH ROAMING CAPABILITY

(71) Applicant: Surround IO, Seattle, WA (US)

(72) Inventors: John Ludwig, Bellevue, WA (US); Richard Tong, Seattle, WA (US)

(73) Assignee: Surround IO, Seattle, WA (US)

( * ) Notice: Subject to any disclaimer, the term of this patent is extended or adjusted under 35 U.S.C. 154(b) by 0 days.

(21) Appl. No.: 14/296,448

(22) Filed: Jun. 4, 2014

(51) Int. Cl.
*H04M 3/00* (2006.01)
*H04W 4/00* (2009.01)
*H04M 3/42* (2006.01)
*G06F 21/10* (2013.01)

(52) U.S. Cl.
CPC .......... *H04W 4/008* (2013.01); *H04M 3/42348* (2013.01); *G06F 21/10* (2013.01)

(58) Field of Classification Search
CPC ..... H04W 8/245; H04W 64/00; H04W 84/18; G06F 21/10

USPC .......... 455/418, 456.5, 41.2; 726/26
See application file for complete search history.

(56) References Cited

U.S. PATENT DOCUMENTS

| | | | |
|---|---|---|---|
| 6,810,259 B1* | 10/2004 | Zhang | 455/456.5 |
| 2009/0051649 A1* | 2/2009 | Rondel | 345/156 |
| 2011/0209221 A1* | 8/2011 | Hanson et al. | 726/26 |
| 2011/0313972 A1* | 12/2011 | Albouze | 707/624 |
| 2013/0005246 A1* | 1/2013 | Waters et al. | 455/41.1 |
| 2013/0011025 A1* | 1/2013 | Liu et al. | 382/118 |

* cited by examiner

*Primary Examiner* — Danh Le
(74) *Attorney, Agent, or Firm* — FSP LLC (57) ABSTRACT

A system includes digital media rendering devices and logic to federate the plurality of devices into a single federated rendering device for a proximate mobile device. The system accepts a request from the mobile device for rendering services by the federated rendering device via a rendering protocol.

11 Claims, 2 Drawing Sheets

FEDERATED BLUETOOTH DEVICE NETWORK WITH ROAMING CAPABILITY

BACKGROUND

A variety of protocols exist which enable the remote use of speakers, mics, and displays by devices. The Bluetooth wireless protocol provides a convenient way for cell phones to use external microphones and speakers without any cable attachment. Bluetooth is pervasively available on most cellphones, in most new cars, and in many headset products. The Airplay wireless procotol provides a convenient way for PCs, mobile devices, or other devices to render their audio and video output on a remote display. A similar protocol called Miracast performs the same function, as does DLNA.

Small devices (sometimes called "Internet of Things" devices) with cameras, mics, and speakers are becoming very cheap, and a wide variety of products are becoming available. It is reasonable to expect that a typical house or office may have tens or hundreds of devices with mics and speakers. As speaker/microphone devices become very cheap, there might be one in every room in a house, or even many in a room. Speakers and microphones may become embedded in many other commonly installed devices—TVs, PCs, tablets, etc. And in the office environment, there may be one in every room, and conference rooms may have many inexpensive speakers and mics.

While these devices could work as remote Bluetooth mics and speakers or Airplay speakers, the Bluetooth and Airplay protocols are awkward for this scenario. A user would have to explicitly pair their phone with many mics and speakers, and continually link and unlink to the closest mic and speaker. Additionally, if many users want to use the devices as Bluetooth mics and speakers, the constant linking and unlinking is complicated to manage, with many possibilities for collision and contention.

'Sensor' in this context refers to a device or composition of matter that responds to a physical stimulus (as heat, light, sound, pressure, magnetism, or a particular motion) and transmits a resulting impulse (as for measurement or operating a control).

'Microphone' in this context refers to an acoustic-to-electric transducer or sensor that converts sound into an electrical signal. Many microphones use electromagnetic induction (dynamic microphone), capacitance change (condenser microphone), piezoelectric generation, or light modulation to produce an electrical voltage signal from mechanical vibration.

'Camera' in this context refers to a device that records images and/or video, either as analog or as digital information signals.

'Stereo' in this context refers to sound reproduction that creates directionality and audible perspective by using two or more independent audio channels through a configuration of two or more speakers in such a way as to create the impression of sound heard from various directions, as in natural hearing.

'Speaker' in this context refers to an electroacoustic transducer that produces sound in response to an electrical or optical audio signal input.

'Motion detector' in this context refers to a device that detects moving objects, often people. A motion detector includes a motion sensor that transforms input signals indicative of motion in the field of view into an electric signal. This may be achieved by measuring optical changes in the field of view.

'Magnetometer' in this context refers to a device used to measure the strength and, in some cases, the direction of magnetic fields.

'LED' in this context refers to (light emitting diode) a semiconductor light source including one or more diodes that when biased release energy in the form of photons.

'GPS' in this context refers to (Global Positioning System) a space-based satellite navigation system that provides location and time information in most weather conditions, anywhere on or near the Earth where there is an unobstructed line of sight to four or more GPS satellites. The system provides critical capabilities to military, civil and commercial users around the world. It is maintained by the United States government and is freely accessible to anyone with a GPS receiver.

'Multimedia' in this context refers to an image, or a set of images, or a video clip, or a set of video clips, and any audio associated with the images or video clips.

'Image' in this context refers to information captured and stored by a device representing a visual perception, usually a two-dimensional picture. Images may be captured, stored, and communicated by devices in either analog or digital formats.

'Video' in this context refers to information captured and stored by a device representing a sequence of moving pictures. Video may be captured, stored, and communicated by devices in either analog or digital formats.

'Audio' in this context refers to a representation of sound within a device or a physical storage or communication media, typically as either analog or digital signals.

'API' in this context refers to (Application Programming Interface) a protocol for interfacing to and invoking functions and data of logic components. For example, an API may include specification for logic procedures (functions, routines), data structures, object classes, and variables.

'Synchronize' in this context refers to operating in unison, so that the operation or occurance of one component or signal is timed to take place at or close to the operation or occurance of another component or signal.

'Monitor' in this context refers to measuring or recording on an ongoing or recurring basis for a specific purpose.

'Configure' in this context refers to setting up for operation in a particular way.

'Integrate' in this context refers to forming, coordinating, and/or blending into a functioning and unified whole.

'Mechanism' in this context refers to a process, technique, device, or system of devices for achieving a result.

'Biometric' in this context refers to a measurement and analysis of a unique physical or behavioral characteristic of an individual, as a mechanism of verifying the individual's identity.

'Coordinate' in this context refers to a process or configuration of bringing objects or signals into a common action or condition.

'Process (Data)' in this context refers to (data processing) any process that utilizes device logic to manipulate signals representing numeric values or symbols into control signals to a circuit, output device, or communication media. Data processing may involve recording, analyzing, sorting, summarizing, calculating, disseminating and storing electrical, optical, or magnetic signals representing numbers or symbols. Data-processing devices and systems of devices typically manipulate data signals to alter the material configuration of machine memory devices or the behavior of circuits or output devices.

'Resource (Device)' in this context refers to any physical or virtual component of limited quantity and/or availability within a device. Every device connected to a computer system is a resource. Every internal system component is a resource. Virtual system resources of data processing devices include files, network connections and memory areas.

'Session' in this context refers to an exchange of signals between two or more communicating devices, or between a device and a person, that begins with an explicit set up procedure and ends at a certain point in time, either implicitly or by being torn down. Signals between the devices between establishment of the session and the end of the session are not part of the session. An established communication session may involve more than one message in each direction. A session is sometimes stateful, meaning that at least one of the communicating parts needs to save information about the session establishment or history in order to be able to communicate, as opposed to stateless communication, where the communication comprises independent requests with responses and no requirement of stored state to maintain communication.

'Database' in this context refers to an organized collection of data (states of matter representing values, symbols, or control signals to device logic), structured typically into tables that comprise 'rows' and 'columns', although this structure is not implemented in every case.

'Application (logic)' in this context refers to logic that causes a computer to perform tasks beyond the basic operation of the computer itself. The term "application" may be abbreviated in some contexts to simply "app". An application may be logic built upon or integrated with operating system logic. Examples of application logic include enterprise software, accounting software, office suites, graphics software, games, web browsers, and media players. Applications may be bundled with the computer and its system software or published separately. Application logic applies the capabilities of a particular computing platform or system software to a particular purpose. Some applications are available in versions for several different platforms; others have narrower requirements and are thus called, for example, a Geography application for Windows or an Android application for education or Linux gaming.

'Operating system (logic)' in this context refers to logic that manages device hardware resources and provides common services for application logic. The operating system is a vital component of many devices, such as computers and mobile phones. Application logic usually requires an operating system in order to function. Operating systems typically manage utilization of device resources, such as I/O devices, displays, processor utilization, memory, mass storage, and printing. The operating system acts as an intermediary between applications and the hardware resources, although applications are often (though not always, in the case of virtual machines) executed directly by the device hardware (e.g., one or more CPUs) and will frequently make system calls to the operating system, or be interrupted by it. Operating systems can be found on almost any device that contains a programmable processor or controller, from cellular phones and video game consoles to supercomputers and web servers.

'Distributed (logic)' in this context refers to logic that cooperatively executes on multiple different devices, separated in space and each capable of operating independently of the others. Web services may be designed as distributed logic, with many different independent devices in disparate locations cooperating to provide a common set of features.

'Web service (logic)' in this context refers to logic which can be invoked to provide functionality to network devices at a network address over the Internet or a private network. A web service provides interoperable machine-to-machine interaction to make available a set of functionality over a network.

'MMOG (logic)' in this context refers to "Massively Multiplayer Online Game".

'SOC (logic)' in this context refers to "System-On-A-Chip", also sometimes called PSOC (Programmable System on a Chip), is logic that integrates all components of a computer or other electronic system into a single integrated circuit. The package may comprise digital, analog, mixed-signal, and often radio-frequency functions—all on a single integrated circuit substrate. A common use for SOCs is in embedded systems.

'Server (logic)' in this context refers to logic designed to respond to requests for functionality from client logic that interacts with the server logic via a request/response model, often over a network. Thus, the server performs some operation utilizing the underlying resources of the device or devices hosting the server, on behalf of clients (request submitters). The client logic either executes on the same device or devices as the server logic, or interacts with the server logic through a machine data network.

'Data center (logic)' in this context refers to a facility used to house computer systems and associated components, such as telecommunications and storage systems. It generally includes redundant or backup power supplies, redundant data communications connections, environmental controls (e.g., air conditioning, fire suppression) and security devices, as well as hundreds or thousands of server systems. Large data centers are industrial scale operations.

'Engine (logic)' in this context refers to logic designed to respond to requests for functionality from applications, and designed to deliver events to applications. The engine operates independently from applications, performing arbitrary processing, and can provide services to several applications simultaneously. The engine may response to a specific request from an application, or may deliver notifications or events to the application based on actions elsewhere in the system.

'Game engine (logic)' in this context refers to logic design to respond to request for functionality from game applications, and designed to deliver events to game applications. The game engine may keep track of game state shared by several players, may notify game applications of the arrival or departure of players, may forward commands and events from one player to another, or provide any other services for a game.

'WiFi' in this context refers to technology that allows an electronic device to exchange data wirelessly (for example, using radio waves) over a computer network, including Internet connections. WiFi can refer to wireless local area network (WLAN) communication logic and techniques that are based on the Institute of Electrical and Electronics Engineers' (IEEE) 802.11 standards.

'BlueTooth' in this context refers to standard IEEE 802.15.1, is a wireless technology standard for exchanging data over short distances (using short-wavelength radio transmissions in the ISM band from 2400-2480 MHz) from fixed and mobile devices, creating for example personal area networks with levels of security.

'Ethernet' in this context refers to a family of computer networking technologies for local area networks (LANs). The Ethernet standards comprise several wiring and signaling variants of the OSI physical layer. Ethernet may operate over physical transmission media including coaxial cables, twisted pair, and fiber optic. Ethernet divides a stream of data into shorter pieces called frames. Each frame contains source and destination addresses and error-checking data so that damaged data can be detected and re-transmitted. As per the OSI model Ethernet provides services up to and including the data link layer.

'Z-Wave' in this context refers to a wireless communications protocol designed for home automation, specifically to remotely control applications in residential and light commercial environments. The technology uses a low-power RF radio embedded or retrofitted into home electronics devices and systems, such as lighting, home access control, entertainment systems and household appliances. Z-Wave communicates using a low-power wireless technology designed for remote control applications. The Z-Wave wireless protocol provides reliable, low-latency communication of small data packets. Z-Wave operates in the sub-gigahertz frequency range, around 900 MHz.

'RFID' in this context refers to (radio-frequency identification), a wireless non-contact system that uses radio-frequency electromagnetic fields to transfer data from a self-contained tag attached to an object. Some tags require no intrinsic power source and are powered and read at short ranges via magnetic fields (electromagnetic induction). Others use an intrinsic or local power source and emit radio waves (electromagnetic radiation at radio frequencies). The tag contains electronically stored information which may be read from a short distance away. The tag does not need to be within line of sight of the reader and may be embedded in the tracked object.

'Backhaul' in this context refers to the intermediate links between a network and devices on the edge of the network (i.e., leaf nodes of the network). Backhaul may refer to the portions of a local or intermediate network (e.g., Internet Service Provider) that communicate with the global Internet.

'Mesh network' in this context refers to a type of device network where each node (device) must not only input, store, and disseminate its own data, but also serve as a relay for other nodes. That is, each device that acts as a node in a mesh network must collaborate to propagate data communicated from other nodes in the network.

'Modem' in this context refers to (modulator-demodulator) a device that modulates an analog carrier signal to encode digital information, and also demodulates such a carrier signal to decode the transmitted information.

'Phone line' in this context refers to a circuit on a telephone communication system, typically referring to the physical wire or other signaling medium connecting or capable of connecting a telephone device to the telecommunications network, and usually associated with a telephone number for addressing communications to and from the connected telephone.

'Cable (Line)' in this context refers to a physical media for distributing data, audio streams, and video streams to end devices in homes and offices via radio frequency (RF) signals transmitted (typically) through coaxial cables or light pulses through fiber-optic cables.

'Cellular (Device)' in this context refers to a device that can place and receive voice communication calls, and typically also communicate non-voice data, over a radio link while moving around a wide geographic area. Cellular devices connect to a cellular network provided by a cellular system operator (e.g., a phone company), allowing access thereby to the public (wired communication) telephone network and usually to the global Internet as well.

'Peer-to-peer' in this context refers to a device network in which each device acting as a node in the network may act as a client or server for the other nodes in the network, allowing shared access to various resources such as files, peripherals, and sensors without necessarily utilizing a central server device.

'IP' in this context refers to (Internet Protocol) a primary protocol in the Internet protocol suite designed to enable delivery of data packets from a source device to a destination device based on an address (i.e., an IP address). IP defines datagram structures that encapsulate the data to be delivered. It also defines addressing mechanisms to identify the datagram source and destination devices.

'FTP' in this context refers to (File Transfer Protocol) a standard network protocol to enable the transfer of files (collections of data that may be stored, referenced, and manipulated as a unit) from one device or to another device over a TCP-based network, such as the Internet. 'TCP' in this context refers to (Transmission Control Protocol) a primary protocol of the Internet protocol suite, enabling reliable, ordered delivery of a stream of octets from one device to another over device networks, such as the Internet.

'UV' in this context refers to (ultraviolet) electromagnetic radiation with a wavelength shorter than that of visible light, but longer than X-rays, that is, in the range 10 nm to 400 nm, corresponding to photon energies from 3 eV to 124 eV.

'IR' in this context refers to (infrared) electromagnetic radiation with longer wavelengths than those of visible light, extending from the nominal red edge of the visible spectrum at 0.74 micrometers (μm) to 0.3 mm. This range of wavelengths corresponds to a frequency range of approximately 430 down to 1 THz,[1] and includes most of the thermal radiation emitted by objects near room temperature.

'RF' in this context refers to (radio frequency) a rate of oscillation in the range of about 3 kHz to 300 GHz, which corresponds to the frequency of electromagnetic radio waves, and the alternating currents which carry radio signals. RF usually refers to electrical rather than mechanical oscillations, although mechanical RF systems do exist.

'DNS' in this context refers to (Domain Name Service) an collection of devices and logic implementing a hierarchical distributed naming system for devices, services (Internet accessible logic), or any resource connected to the Internet or a private network. A DNS system translates domain names meaningful for users (people using the network) to the numerical IP addresses needed for the purpose of locating devices, services, and resources worldwide.

'Web site' in this context refers to a set of one or more web pages served from a single web domain. A web site is presented for access by external devices by at least one web server, and accessible via a network such as the Internet or a private local area network through an Internet address known as a Uniform Resource Locator.

'URL' in this context refers to (Uniform Resource Locator) a character string that comprises a reference to a network resource, typically one that is accessible to a web browser via an interaction with a web server.

'Web page' in this context refers to a file configured for access and display via a web browser over the Internet, or Internet-compatible networks.

'Web browser' in this context refers to logic for retrieving, presenting and traversing information resources on the World Wide Web. An information resource is identified by a Uniform Resource Identifier (URI) and may be a web page, image, video or other piece of content. Hyperlinks present in resources enable users easily to navigate their browsers to related resources. A web browser can also be defined as an application software or program designed to enable users to access, retrieve and view documents and other resources on the Internet.

'Web server' in this context refers to a device or device system that delivers web pages in response to requests for the web pages from web browsers.

'Web domain' in this context refers to an Internet Protocol (IP) resource, such as a personal computer used to access the Internet, a web server computer hosting a web site, the web site itself, or any other service communicated via the Internet.

'RSS' in this context refers to (Really Simple Syndication) a family of data formats and techniques to publish frequently updated works of authorship. An RSS document (which is called a "feed", "web feed", or "channel") may include full or summarized text, plus metadata such as publishing dates and authorship.

'Cloud (Network)' in this context refers to device resources delivered as a service over a network (typically the Internet).

DESCRIPTION

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic will vary according to implementation.

Devices and a system are described which enable a network of monitoring devices to be federated and act as a single rendering device for multiple concurrent users; these devices are designated "host" devices, as they host the federated rendering service and collectively form the 'federated device'. Devices, such as cell phones requesting the rendering service, are designated "client" devices. Client devices may request rendering services from the federated device via a "rendering protocol" such as Bluetooth, Airplay, DLNA, or any other protocol which permits remote rendering.

In one embodiment the system is enabled by a collection of devices, each of which has sensors, including but not limited to cameras, microphones, motion sensors, accelerometers, and proximity sensors. The devices may also incorporate a variety of outputs, including but not limited to video, audio, speakers, and LED lights. The devices will have network connectivity of some sort, and may utilize AC or battery power. The devices may be standalone devices or integrated into other electric and electronic devices, and may be stationary, movable, or even mobile (drones). The devices can be used alone or in groups. More detail on exemplary logic for the devices that form the federated network is described in Appendix A, "Exemplary Host Device".

Each host device comprises logic to federate rendering activity. There may be an additional service that runs on a central server or network service to coordinate and manage the host devices, or this responsibility may be distributed across the host devices (peer-to-peer).

Each host device presents its availability as a rendering device via the mechanisms of the particular rendering protocol. A client device, such as a cell phone, pairs and links with the federated device at any one of the host devices via the rendering protocol. Each host device responds on demand to any request for rendering service, and provides a virtual device name to a cell phone or other client device requesting service. The host devices maintain a shared database of client devices and connection status. One sequence embodiment of operations for the host device is as follows:

Host device receives request from client for rendering service
Host device checks client ID against database of known client devices
  If client has never connected
    Create a new client entry in the db
    Create a connection with client
    Update connection status in db
  Else
    Create a connection with client
    Update connection status in db The host devices communicate between themselves to keep the shared database synchronized using off-the-shelf database synchronization solutions. Multiple users can pair their client devices with host devices. To each cell phone or client device, at a protocol level, the network of host devices appears as a single device—a single Bluetooth device, or a single Airplay device, etc. If the client device moves, the host devices cooperate to hand link responsibility off between one another. To the client device, this is transparent as each host device presents itself as the same virtual paired device. As a client device moves from an area serviced by host device A to that serviced by host device B, the handoff occurs as follows:

Host device B detects that client is near
  Host device gets connection status from db
  Host device B sends request to host device A to drop connection
  If host device A responds positively
    Host device B creates connection with client
    Host device B updates connection status in db As a user moves through the space covered by the participating host devices, the user's location is tracked. This may happen via motion tracking, via voice recognition, via electronic detection of the user's phone or logins, via integration with the user's calendar, by some explicit action on the user's part, or by any other mechanism available, and by any combination of these mechanisms. The location of the closest host device is noted in the shared database.

When the client device wishes to render content to the host device nearest the user, the host devices cooperate to route the content to the correct host device. For instance, when an inbound call arrives, the user's phone notifies the a host device of the federated device, e.g. host device A, that it is currently linked with via the Bluetooth protocol that a call has arrived. Host device A reads the user's current location from the shared database, and retrieves the address of the host device serving that user, host device B. Host device A establishes a connection with host device B and sends the call information to host device B, and host device B presents an inbound call alert—ringing, voice announcement, on-screen alert, or other mechanism. The user can accept the call by voice command, gesture, or other method of interaction with host device B. Host device B updates the shared database, and notifies host device A to complete the call. Incoming audio is then routed from the phone, over the Bluetooth connection to host device A, then over the IP network to host device B, and then rendered at the speaker at that device. Outgoing audio follows the reverse path.

The user can create "do not disturb" rules by time and location. These are noted in the shared database, and the host devices will respect these rules and only attempt to complete calls if permitted. Outbound calls are initiated by voice, gesture, or other means. Outgoing audio is then picked up by the mic at host device B, routed over the IP network to host device A, sent to the phone over the Bluetooth connection, and then out on the carrier network using the standard telephony services. Incoming audio follows the reverse path.

As the user moves, their location is tracked. Audio for the current call is handed off to closest device continuously.

Host device C detects that user is near
Host device gets connection status from db
Host device C sends request to host device B to drop connection
If host device B responds positively
Host device C creates connection with host device A
Host device C updates connection status in db As a refinement, this handoff may happen gradually, and rendering may happen simultaneously at both device B and device C for a period of time or within an overlapping service boundary of B and C. The user can also expand or move rendering to additional devices via gesture or other interface. For instance, if the user wants audio to be broadcast over 5 devices, the user can indicate the 5 devices via some interface (e.g., an inclusive gesture to a camera federated with the host devices), and audio will be broadcast over all these.

Multiple users may utilize the system simultaneously. Their phones (or other devices) can each independently pair with a host device, and each user will be tracked, and audio can be routed to each user's location. If two users enter the same area for a call, they can optionally merge their calls into a single conference call. A host device that is currently engaged with rendering a call for user 1 can detect that user 2 has entered the area serviced by the host. The users can then indicate by gesture or some other interface that they wish to merge the calls. If the calls are merged, the rendering host:

will accept incoming audio packets from the two host devices
connected to the two user's phones, mix them, and play them over the
local speakers;
will accept local mic input, mix it with the audio from user 1's
phone, and deliver back to the device servicing user 2's phone;
will mix local mic input with the audio from user 2's phone, and
deliver back to the device servicing user 1's phone.

If the users choose not to merge the calls, then rendering of the newly arrived user's call will either:
be suspended until the user leaves the area and is detected by an
idle host device, at which point rendering will start at that device
be terminated, breaking the Bluetooth connection.

The system allows a caller to easily use many disparate microphones and speakers for their calling, without the burden of constantly pairing. The system allows a caller to easily move from one mic/speaker to another during a call. The system allows many callers to use the same installed based of mics and speakers easily. The system provides a convenient way to create a conference call.

DESCRIPTION OF ILLUSTRATIONS

Figure 1:
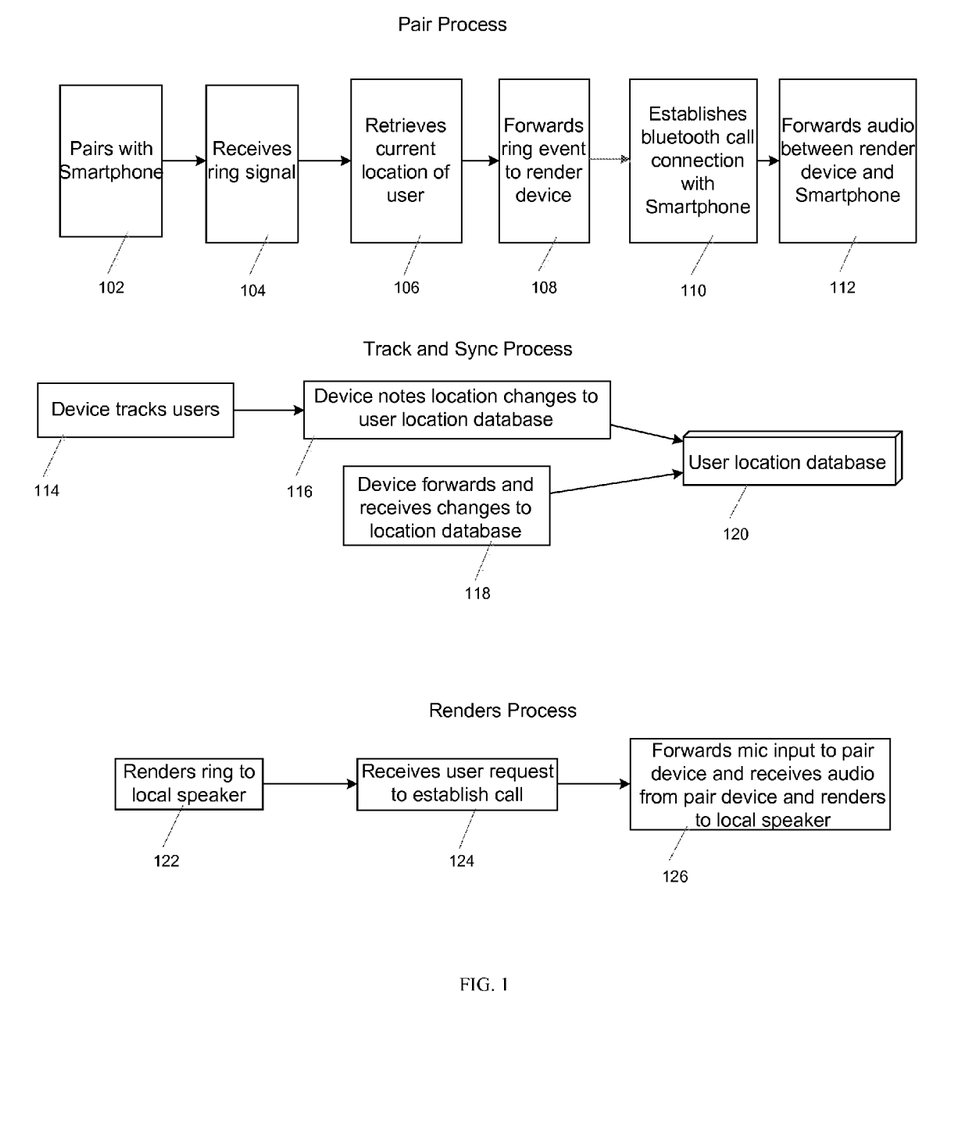
FIG. 1 is an illustration of logic modules implemented for each device of the system.

FIG. 1 shows the software elements that reside on each element of the system. Each device runs a process 101 to manage pairing with phones, a process 103 to render output and capture input from the local mic and speaker, and a process 105 to track users and to update a location database. Each participating device runs a set of processes. A pairing process 101 pairs with a phone 102 and creates a Bluetooth connection 110 with the phone or other supported Bluetooth device. The pairing process accepts incoming ring signals 104 from the phone and forwards ring events to the render device 108, initiates outbound calls with the phone, and transfers audio to and from the phone 112. The pairing process queries the local copy of the location database 106 to determine which device to deliver audio and signaling information to.

A rendering process 105 accepts incoming ring signals and audio from a pairing process and renders them locally on the local speakers 122. The process 105 gets input from the user to accept calls or to initiate calls 124. The rendering process takes this call management input, and any microphone input, and delivers it back to the pairing processing 101 which is connected to the user's phone 126.

A tracking process 103 keeps track of which users are in the area of the device 114 and updates 116 a location database 120. As users change location, it shares location change information with other devices so that the location database is kept up to date 118.

Figure 2:
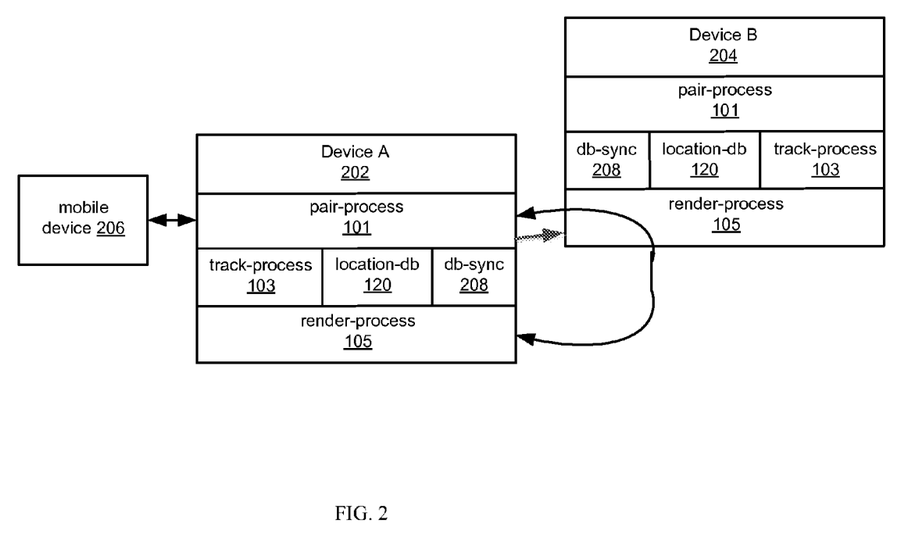
FIG. 2 is an illustration of a flow of operations performed by each of the processes on the device for incoming calls—the pairing process, the tracking process, and the rendering process.

FIG. 2 shows the flow of operations performed by each of the processes on the device for incoming calls—the pairing process 101, the tracking process 103, and the rendering process 105. The pairing process 101 on each device pairs with one or more smartphones 206 using the Bluetooth protocol. The smartphone 206 delivers a ring signal to the device for each incoming call. The pairing process 101, on receipt of the ring signal, queries the location database 120 to determine the current physical location of the user. Once the location is determined, the pairing process 101 forwards the ring signal event to the rendering process 105 on the device 202 that the user is currently associated with, which may be the same device as the pairing process 101 is on. The pairing process 101 waits for a response from the rendering process 105. When the rendering process 105 indicates that the user has accepted a call, the pairing process 101 establishes a Bluetooth call connection with the smartphone 206. The pairing process 101 accepts inbound audio from the smartphone 206 and forwards it to the rendering process 105, and accepts outbound audio from the pairing process 101 and forwards it to the smartphone 206. The rendering process 105 accepts an inbound ring signal from a pairing process 101 and renders it locally on attached speakers. It monitors user input, and if the user indicates by any method that they wish to accept a call, the rendering process 105 communicates this back to the pairing process 101. The rendering process 105 then accepts input from the local microphone and forwards it to the pairing process 101, and accepts an audio stream from the pairing process 101 and renders it locally on attached speakers. The tracking process 103 detects what users are nearby using face recognition, or user calendar data, or explicit logins, or any other mechanism at its disposal. It updates 208 a local database 120 of location information, and forwards changes in user location information to other nodes, and accepts incoming notices of user location changes and stores this in its database 120.

Implementations and Alternatives

The techniques and procedures described herein may be implemented via logic distributed in one or more computing devices. The particular distribution and choice of logic is a design decision that will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Exemplary Host Device(s)

A monitoring device. This could be in many different form factors, including but not limited to:

a smoke alarm sized unit, which can be installed in place of an existing smoke alarm an electrical switch-box sized unit, which can be installed in an existing electrical switchbox an OEM product integrated into a TV or other appliance a light-bulb shaped unit which can be placed in a light socket a standalone unit which can be placed freely anywhere in a room a personal computer, tablet, mobile phone or game console a web cam or similarly shaped device a drone unit which can independently move throughout an area—a rolling unit, or an aerial unit The device includes an array of sensors: any combination of integrated smoke sensor heat sensor microphone or stereo microphones or microphone array multiple stereo cameras or range cameras or 3d cameras (potentially 4, pointing NSEW)

motion detector magnetometer infrared thermometer proximity or distance sensors low light imaging sensors such as IR or sonar, GPS receiver The device includes provisions for output: any combination of Integral speakers Audio output, either analog or digital Display LEDs An integral screen display Video output such as VGA, HDMI, or other Drone units also include hardware for moving—rolling or flying.

The device includes a network connection including but not limited to:

WiFi access point with a backhaul channel implemented over wired Ethernet over power transmission wires via WiFi "mesh" (peer-to-peer with other co-located WiFi devices, and wirelessly terminating at a modem, phone line, cable line, or other wired transmission media)

a cellular radio as a back-up communication source if a primary communication media fails due to a power or service outage, or due to tampering.

Bluetooth to a Bluetooth access point or personal area network other radio frequency system other hard wired system the connection may be intermittent so the device can operate in a disconnected fashion The device may be A/C powered powered over Ethernet or other low voltage DC means powered using rechargeable batteries. The battery may be easily swapped out for a replacement battery and if the device is autonomous, can use inductive charging so that human intervention is not required to recharge batteries.

The product can be deployed in many ways, in either standalone mode or in a multi-unit cooperative mode:

A single stationary device monitoring a room

Multiple stationary devices monitoring multiple rooms

Multiple stationary devices monitoring the same space or overlapping spaces.

A single mobile device, the device being autonomously mobile

Multiple mobile devices

Some combination of mobile devices and stationary devices

Stationary devices can also be moved by the device owner to provide monitoring in different areas at different times.

In all cases, companion PC and tablet applications may exist to complete the service.

A device may replace an existing smoke alarm, or an existing set of light switches, or light bulb. It should be installed in a location with good optical visibility of the area it is intended to monitor. The unit may provide a customizable case, enabling the installation of custom veneers/covers.

What is claimed is:

1. A system comprising:
a plurality of digital media rendering devices;
non-transitory logic to federate the digital media rendering devices into a single federated rendering device configured for utilization by a proximate mobile device for rendering digital media;
non-transitory logic to accept a request for rendering services from the proximate mobile device to the single federated rendering device via a rendering protocol;
non-transitory logic to track physical movement of the proximate mobile device and to implement a hand-off of rendering of audio from the proximate mobile device continuously to a device of the digital media rendering devices physically closest to the proximate mobile device; and
non-transitory logic to implement the hand-off in a graduated fashion, with rendering of the audio from the proximate mobile device occurring simultaneously from more than one of the digital media rendering devices for a period of time or within an overlapping service boundary of the more than one of the digital media rendering devices.

2. The system of claim 1, the rendering protocol being one or more of Bluetooth, Airplay, or DLNA.

3. The system of claim 1, wherein each of the digital media rendering devices comprises the logic to federate rendering of the digital media.

4. The system of claim 1, further comprising:
a server system comprising non-transitory logic to coordinate and manage the rendering devices.

5. The system of claim 1, further comprising:
non-transitory logic to respond to the request for rendering services with a virtual device name.

6. The system of claim 1, further comprising:
a shared database configured for utilization by the single federated rendering device and comprising a connection status for each of a plurality of mobile devices comprising the proximate mobile device.

7. The system of claim 6, further comprising:
non-transitory database synchronization logic to maintain the shared database in a synchronized state.

8. The system of claim 1, further comprising non-transitory logic to coordinate the digital media rendering devices to hand off link and rendering responsibility for the proximate mobile device between the digital media rendering devices.

9. The system of claim 1, further comprising:
non-transitory logic to implement within the single federated rendering device "do not disturb" rules for the proximate mobile device by time and location.

10. The system of claim 1, further comprising:
non-transitory logic to expand or move rendering of the audio from the proximate mobile device to additional devices of the digital media rendering devices via gestures.

11. The system of claim 1, further comprising:
logic to detect a plurality of mobile devices in a same physical area and to merge calls to the plurality of mobile devices in a same physical area into a single rendering of a conference call.

* * * * *